March 2, 1926.
T. GUZA
1,575,577
HAND DRIVEN CIRCULAR SAW
Filed Nov. 17, 1922   2 Sheets-Sheet 1
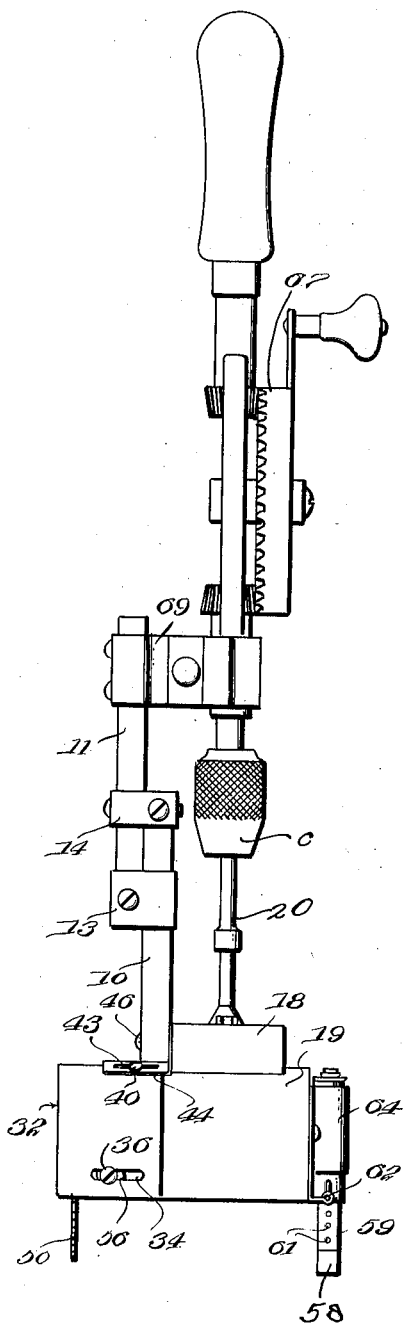

March 2, 1926.
T. GUZA
HAND DRIVEN CIRCULAR SAW
Filed Nov. 17, 1922  2 Sheets-Sheet 2
1,575,577
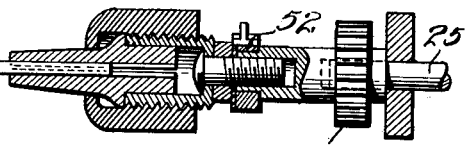
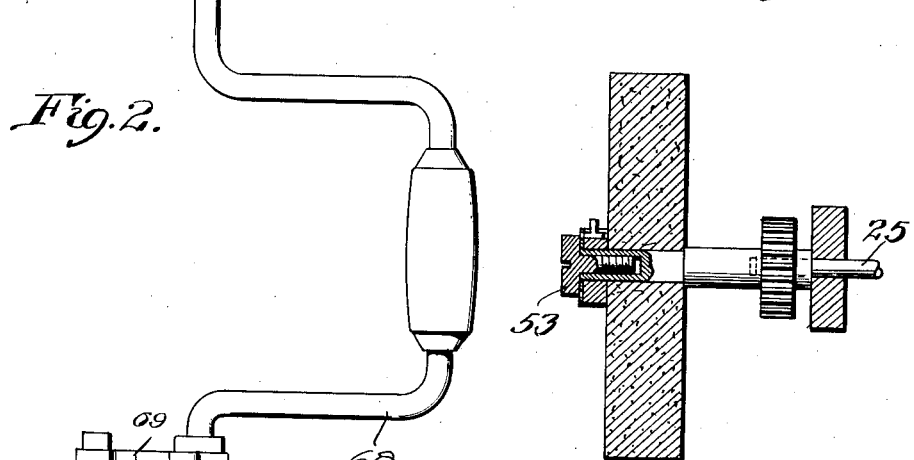
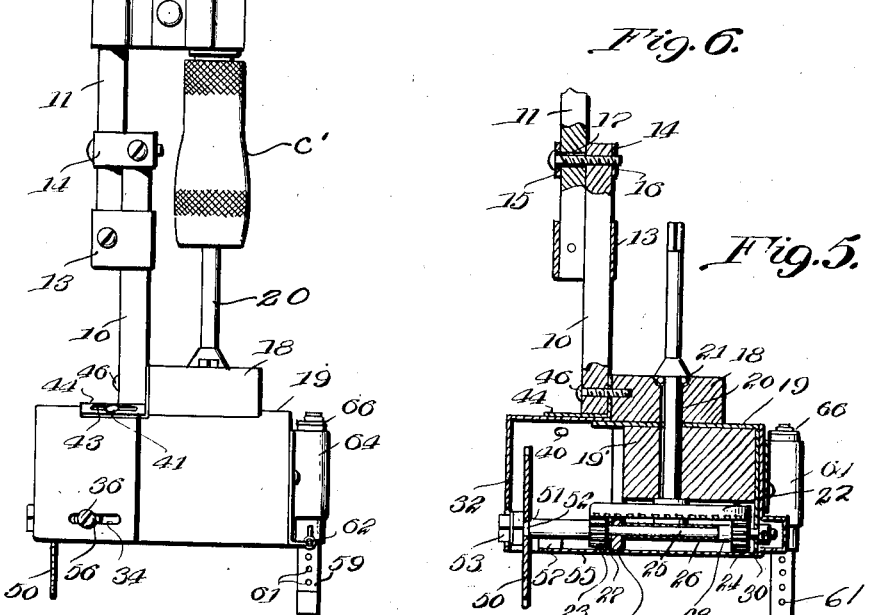
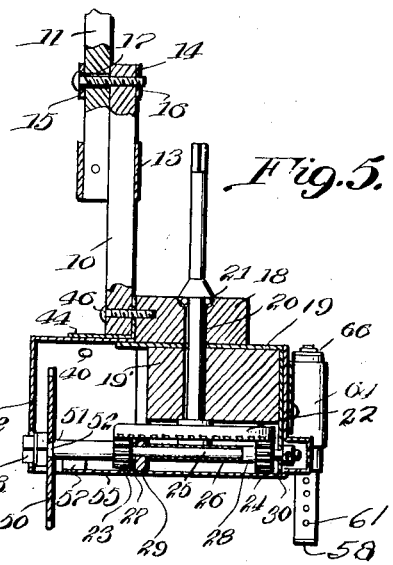
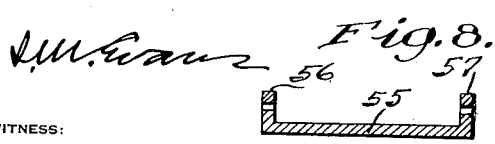

Patented Mar. 2, 1926.

1,575,577

UNITED STATES PATENT OFFICE.

THOMAS GUZA, OF FLINT, MICHIGAN.

HAND-DRIVEN CIRCULAR SAW.

Application filed November 17, 1922. Serial No. 601,569.

*To all whom it may concern:*

Be it known that I, THOMAS GUZA, a citizen of the United States, residing at Flint, in the county of Genesee and State of Michigan, have invented new and useful Improvements in Hand-Driven Circular Saws, of which the following is a specification.

The object of this invention is to provide a hand driven tool which shall include a circular saw and which may be transformed into a grinding or polishing device, drill operating means, or a cutting device.

A further object is to provide a device of this type which may be mounted in a vise or the like, or which may be used in a bit brace.

A still further object is to provide means whereby a circular saw may be caused to make a cut at any particular angle desired.

With the foregoing and other objects in view, the invention consists in the novel construction and arrangement of elements described and claimed, it being understood that modifications may be made within the scope of the claim without departing from the spirit of the invention.

In the drawings, Figure 1 shows the device in side elevation; Figure 2 is a side elevation showing a modified drive involving the use of a bit brace, the saw-mounting means being the same as in the first form; Figure 3 is in elevation, looking from the right in Figure 1, and shows the housing and adjustable shank connected therewith (part of the gage mounting means being in section); Figure 4 is in elevation, and shows the housing and shank from the left in Figure 1; Figure 5 is chiefly in vertical section, and shows especially the drive for the saw shaft; Figure 6 is a section of a grinding wheel which may be mounted on one of the rotatable elements, in lieu of the saw; Fig. 7 is a section showing the mounting of a boring element in shaft 25; Figure 8 is a section through the bottom plate of the gear housing.

In carrying out the invention, I employ a handle or shank portion comprising the elements 10 and 11, the latter having connected therewith a strap 13 which passes around the element 10 and is slidable with reference thereto. A strap 14 passes around both elements 10 and 11, and is provided with apertures 15 and 16, on opposite sides, one of these apertures registering with an aperture in the element 10, and the other being adapted to register with any of the apertures 17 in element 11. This arrangement permits of the relative adjustment of elements 10 and 11, in order to vary the length of the handle or shank.

A block 18 is mounted on the outer side of housing 19, and a block 19' is mounted on the inner side, opposite block 18. A shaft 20 passes through both blocks, and is mounted in ball bearings, shown at 21.

Shaft or spindle 20 is received by chuck C or C', to be rotated by suitable means, as indicated below. The adjustment between elements 10 and 11 of the shank permits different sizes or lengths of tool holding devices to be employed.

Rigidly mounted on the inner end of the shaft 20 is a gear wheel 22 meshing with pinions 23 and 24 on the shaft 25 extending perpendicularly with reference to the shaft 20. Pinion 23 is rigid with reference to the shaft 25 and the other pinion is loose thereon. The shaft 25 passes through sleeve 26 retained in position by collars 27 and 28, one end of the shaft having its bearing in element 29, extending across the housing and the other bearing 30 being in the end wall of the housing.

An adjustable end member 32 of the housing is provided with a central aperture 33, and has on each side a slot 34 for screw 36 which passes through the slot and through aperture 35 in housing member 19. Screw 36 also passes through aperture 38 in spacing member 56', the screw being engaged by nut 39.

The adjustable end member 32 is further provided with threaded pins 40 and 41 passing through slots such as 43 in plate 44, the end member being therefore adjustable longitudinally of the housing and having a segmental wall conforming to the curved wall of the main portion of the housing.

The shank portion, or handle, comprising elements 10 and 11 is connected with block 18 by means of screws 46, and by taking out the screws, and transferring the connection from one end of the block 18 to the other end, the device may be changed from right to left hand, or vice versa. This permits of the change of position of hand operated wheel 67 of Figure 1 to the other side of the saw.

A circular saw 50, provided with a square aperture 51 may be mounted on the square end of the hub 52 formed on the pinion 23. Connection is effected by a screw 53 passing into the threaded bore of the hub, this hub being rigid with the shaft 25.

By loosening the screws or bolts retaining slidable element 32, and by taking out the screw in the end of the shaft 25, the saw may be removed, and a grind stone, emery wheel, or polishing wheel may be substituted for the saw. A drill bit or auger may also be employed, if desired by using chuck 54.

The housing is closed by means of a plate 55 having apertured ears 56, 57, engaged by the securing devices which fasten the outer portions of the element 32 to the main portion of the housing 19.

A gage 58 mounted on one end of the housing includes the arms 59 and 60, each being provided with a series of apertures, such as 61, for engagement by pins such as 62, so that the gage may be held in an adjusted position. The arms or stems 59, 60 are each mounted to act under the influence of a spring such as 63, surrounding the stem and inclosed in a tube 64 held on the end of housing 19 by element 65 which includes rolled portions adapted to surround tubes 64. Collars 66 on the upper ends of the arms or stems 59, 60 prevent downward movement of the gage beyond a certain limit, but permit the gage to move upward against the action of the springs.

The gage may be employed in connection with straight sawing, and the pins being out of engagement, the spring mounted arms are free to act, so that the gage in this condition acts as a spring held retarding device, controlling the speed with which the saw cut is made in the board. Pressure by the operator on brace 68 tends to compress the springs 63 to the extent desired in allowing the gage to yield and permit the saw to advance into the cut. In this connection it may be stated that a wood cutting saw, or a saw for cutting metal may be employed.

The shank or handle including elements 10 and 11 may be supported in a vise or the like, and movement imparted by wheel 67 to the mechanism for driving the saw. However, if desired, a bit brace 68 may be employed for imparting rotary movement to the shaft and the remainder of the driving mechanism. Element 69 may be clamped to the shank, and serves to guide or clamp the bit brace, according to the type of brace employed.

When it is desired to cut boards or other articles at an angle, the gage 58 is retained in a stationary position by pins 62, before referred to. The gage contacts with the surface of the board, and the edge of the saw of course engages the surface or the side of the gage may engage the surface of a door when the saw is used in making a cut for a mortise in the edge thereof. The slidable movement or adjustment of end member 32 of the housing permits of the use of a larger or wider tool, and as a direct result of the construction here employed, the vertical wall of end member 32 also serves as a spacing member, when placed against a stationary element for making a cut or a number of cuts with the saw, at a distance of one half or three fourths of an inch from said stationary element. In this way, end member 32 may serve as another gage member.

What is claimed is:

In a device of the class described, a housing comprising a plurality of elements, means for connecting said elements of the housing and permitting relative adjustment, a shaft rotatable in the housing, means for connecting a tool with the shaft, means for driving the shaft, a spring mounted and adjustable gage carried by one element of the housing and movable vertically with reference to the lower portion of the housing, the tool and gage operating in approximately parallel planes, and one of said adjustable elements of the housing being movable laterally with reference to the adjacent surface of the saw.

In testimony whereof I affix my signature.

THOMAS GUZA.